United States Patent Office 3,219,177
Patented Nov. 23, 1965

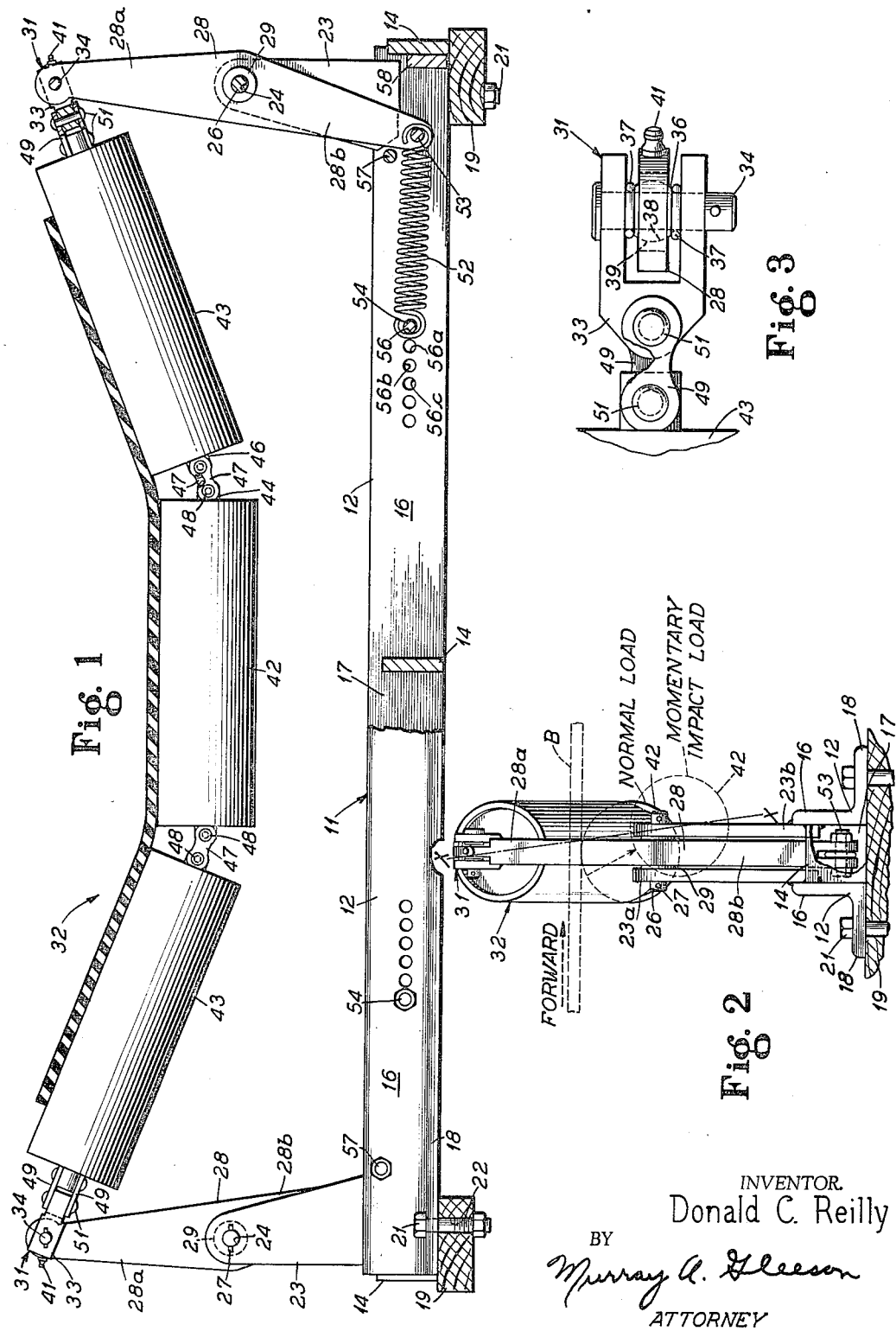
Nov. 23, 1965   D. C. REILLY   3,219,177
IMPACT ABSORBING TROUGHING ROLLER ASSEMBLY
Filed Sept. 16, 1963
INVENTOR.
Donald C. Reilly
BY
Murray A. Gleeson
ATTORNEY

3,219,177
IMPACT ABSORBING TROUGHING ROLLER ASSEMBLY
Donald C. Reilly, Downers Grove, Ill., assignor to Goodman Manufacturing Company, Chicago, Ill., a corporation of Illinois
Filed Sept. 16, 1963, Ser. No. 309,137
5 Claims. (Cl. 198—192)

This invention relates generally to belt conveyors and particularly to an improved troughing roller assembly therefor.

An object of this invention is to provide a troughing roller assembly, for mounting on a fixed base, which approaches the flexibility, economy, and impact-absorbing ability of a rope sideframe conveyor.

There has been a need for such a troughing roller assembly, in conventional, existing rigid frame conveyors, for example at loading points where rigid troughing roller assemblies wear out rapidly, but there is enough wear left in the rest of the structure that it is not yet economical to replace the whole installation with modern rope sideframe conveyor.

Accordingly, a primary object is the provision of an impact-absorbing troughing roller assembly which is compatible with the mounting requirements for a conventional rigid troughing roller assembly, yet is cheap, effective, flexible in both horizontal and vertical directions, and is easily adjustable.

Other objects and advantages will be apparent from the following description taken in connection with the drawings in which:

FIGURES 1, 2 and 3 are, respectively, side, end and partial top views of a preferred form of the improved troughing roller assembly.

Like parts are designated by like reference characters throughout the figures.

An elongated base 11 is fabricated of a pair of angles 12, 12 held in spaced apart relation by spacers or blocks 14, 14, 14. A pair of vertical flanges or sidewalls 16, 16 define a protected cavity 17 between them. The cavity is readily accessible through the top or bottom for easy adjustment of the tensioning springs to be described. Coplanar horizontal flanges 18, 18 of the angles provide a wide flat 2-piece surface to rest on a mounting block 19, fixed by bolts 21 through bolt holes 22.

An upstanding bifurcated bracket 23 is mounted, as by welding, to each end of the base. Each bracket consists of a pair of spaced, parallel gimbals 23a, 23b welded respectively to the opposite sidewalls of the angles. Aligned holes 24, 24 in each bracket carry a pivot pin 26, held against endwise movement by cotter pins 27, 27 or the like.

A generally vertical lever 28 is pivoted midway of its end portions on each pivot pin 26. Washers 29, 29 keep it centered between the gimbals 23a, 23b. The lever has an upper arm 28a with a pivotal connection generally designated 31 to a corresponding end of a flexible troughing roller which itself is generally designated 32. Lower arm 28b extends into a corresponding end of the base cavity 17.

The pivotal connection 31 is preferably a universal connection which allows a limited amount of rotation between the parts as will be described. A ball joint is shown, consisting of a clevis 33, a clevis pin 34 carrying an apertured ball 36 between a pair of resilient centering members 37, 37 which may be common elastomeric O-rings, preferably of oil-resistant material such as "Neoprene."

Mating spherical surfaces 38, 39 of each upper arm 28a and its ball 36 enable the clevis to rock universally in the following ways: vertically; horizontally; angularly; and, within limits rotationally. These mating surfaces are lubricated through a fitting 41.

The troughing roller 32 comprises a center roll 42 flanked by a pair of wing rolls 43, 43 interconnected for free angular movement relative to one another in a vertical direction but resisting such relative angular movement in a horizontal direction. The only substantial movement in a horizontal direction is *unitary* movement of the three rolls. Tht rolls are rotatably journaled respectively on a center shaft 44 and a pair of wing shafts 46, 46. They are *inter*-connected by pairs of short links 47, 47 about horizontal pins 48 and the ends of the wing shafts are *end*-connected to the clevises by links 49, 49 about pins 51 which are in a vertical plane.

A pair of tension springs 52, 52 are horizontally disposed in opposite end portions of the cavity 17. One end of each spring is connected to a pin 53 through the bifurcated bottom of the lever lower arm 28b. The other end of each spring connected to a bolt 54 extending between sidewalls 16, 16 and engaged within pairs of aligned holes 56. Other pairs of holes 56a, 56b, 56c, etc., may be selected to vary the tension in the springs to support varying kinds of load on the troughing roller 32. Where desired, compression springs in suitable mountings may be substituted.

Stops in the cavity 17 limit inward and outward movements of each lever lower arm. The inner stop is a bolt 57. The outer stop is a shim or block 58 fast to the corresponding end spacer 14.

An important feature of this troughing roller assembly is the ability to absorb impact loads exactly as they occur in a moving conveyor belt. Such loads have both downward and forward kicks, with a downwardly/forwardly inclined component. The present invention enables the springs to absorb these impact loads in any direction at which they occur whether this be straight down, straight forward, or any component angle in between. This is a result of combining the ball joints 31, 31 with the flexible troughing roller 32, levers 28, 28 and springs 52, 52.

*Operation*

Now, referring to FIG. 2, assume a belt B moving forward across the troughing roller with the center roll 42 in the solid line position labeled "NORMAL LOAD." In FIG. 2, "forward" is to the right. Note the troughing roller is in a substantially vertical plane with the axis of the center roll directly below the ball joints 31. Now, assume a concentrated load, such as a large rock, is carried over the troughing roller 32. This kicks the troughing roller down and forward momentarily to the broken line position labeled "MOMENTARY IMPACT LOAD." The troughing roller is still coplanar, because of resistance to forward bending provided by the roller interconnections, but is momentarily in an inclined plane X—X due to the above-mentioned downward and forward components of the impact load.

Note that the temporary impact-loaded position is below and forward of the normal-loaded position, and is attained by the following actions, all occurring simultaneously as a result of the present invention: the sag of the troughing roller increases as the individual rolls move angularly downward relative to each other; the three rolls swing forwardly, as a unit because their interconnections are relatively stiff in this direction; the wing shafts 46 are permitted to turn about their axes to enable forward swinging to the above-mentioned inclined plane X—X; and inward movement of the lever upper arms, accompanied by outward movement of the lever lower arms and stretch of the springs.

While one form in which the present invention may be embodied has been shown and described, it will be understood that various modifications and variations thereof may be effected without departing from the spirit and scope of the invention as defined by the appended claims.

I claim:
1. In a troughing roller assembly, the combination of:
an elongated base including a channel member having a pair of vertical sidewalls horizontally spaced apart to provide a protected but accessible horizontal elongated cavity therebetween;
an upstanding bracket mounted on each end of the base;
a lever pivoted intermediate its end portions to the upper end of each bracket, each lever having an upper arm carrying a ball joint and a pivotal link connection to a corresponding end of a flexible troughing roller, and having a lower arm extending into a corresponding end of said cavity; and
a pair of tension springs horizontally disposed in said cavity, each having an outer end connected to a corresponding lower arm and an inner end fixed to the channel member to bias the lever to urge its upper arms in an outward direction to support the troughing roller in tension for movements both longitudinally of the conveyor and transversely relative thereto.

2. In a troughing roller assembly, the combination of claim 1 in which the troughing roller includes a center roll flanked by a pair of wing rolls and pivotally interconnected for relative angular movement in a vertical direction but resisting relative angular movement in a horizontal direction whereby horizontally moving impact loads can be absorbed both by vertical angular movements of the rolls relative to one another and horizontal unitary movement of the troughing roller relative to the base accompanied by flexing of the springs to allow accommodating in and out pivotal movements of the levers.

3. In a troughing roller assembly, the combination of claim 1 in which the base is provided with stops in the cavity to limit both in and out movements of the levers.

4. In a troughing roller assembly, the combination of claim 1 in which the inner end of each spring is fixed to a bolt extending through aligned pairs of holes in said sidewalls, the latter having a plurality of pairs of such aligned holes to enable adjusting the spring tension.

5. In a troughing roller assembly, the combination of:
an elongated base including a channel member having a pair of vertical sidewalls horizontally spaced apart to provide a protected but accessible horizontal elongated cavity therebetween;
an upstanding bracket mounted on each end of the base;
a lever pivoted intermediate its end portions to the upper end of each bracket, each lever having an upper arm with a ball and link connection to a corresponding end of a flexible troughing roller, and having a lower arm extending into a corresponding end of said cavity; and
spring biasing means disposed in said cavity and longitudinally adjustably connected to and between the channel member and the lower arms of the levers at its opposite end for urging the lever upper arms in an outward direction to support the troughing roller in tension.

References Cited by the Examiner

UNITED STATES PATENTS 909,833   1/1909   Vrooman.

FOREIGN PATENTS 239,334   4/1960   Australia.
532,889   11/1954  Belgium.
945,444   1/1962   Great Britain.

SAMUEL F. COLEMAN, *Primary Examiner.*

WILLIAM B. LA BORDE, *Examiner.*